June 29, 1926.
E. E. CULBERTSON
UNIVERSAL JOINT
Filed Nov. 30, 1923
1,590,285
4 Sheets-Sheet 2
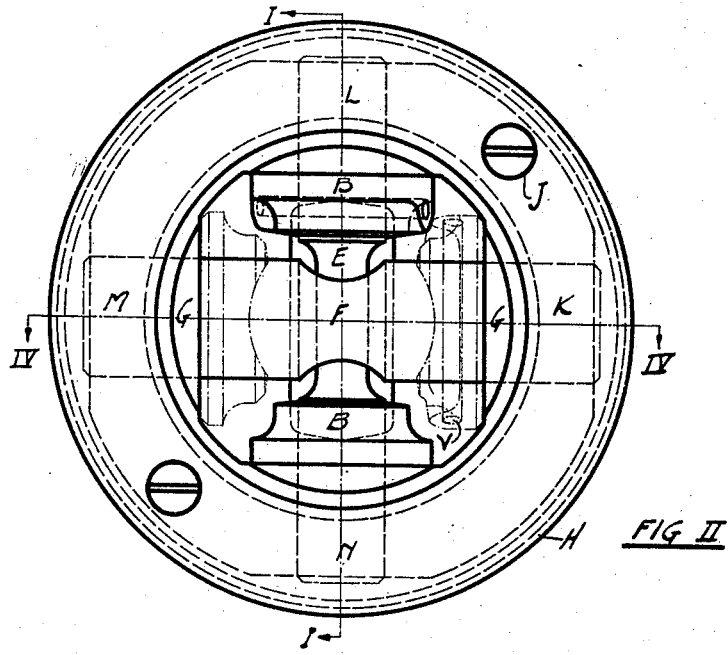
FIG II
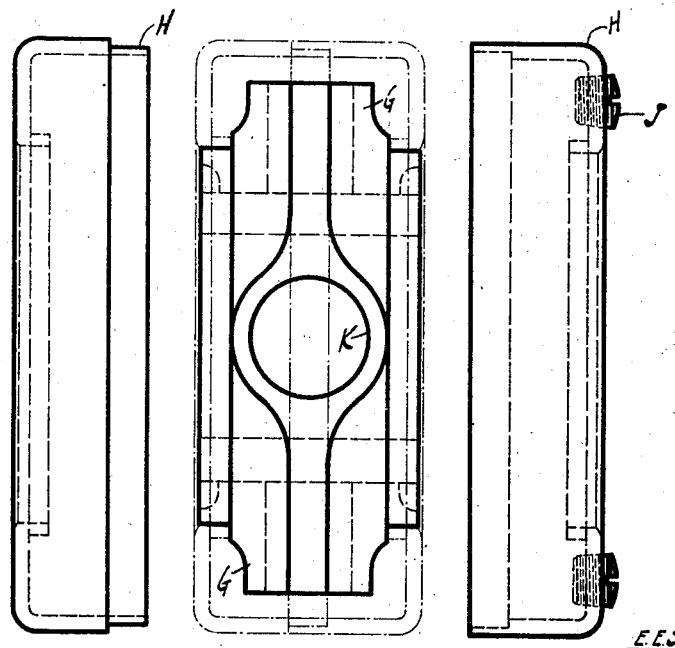
FIG. III
E. ESTAY CULBERTSON
INVENTOR.
BY
S. M. UDALE
ATTORNEY.

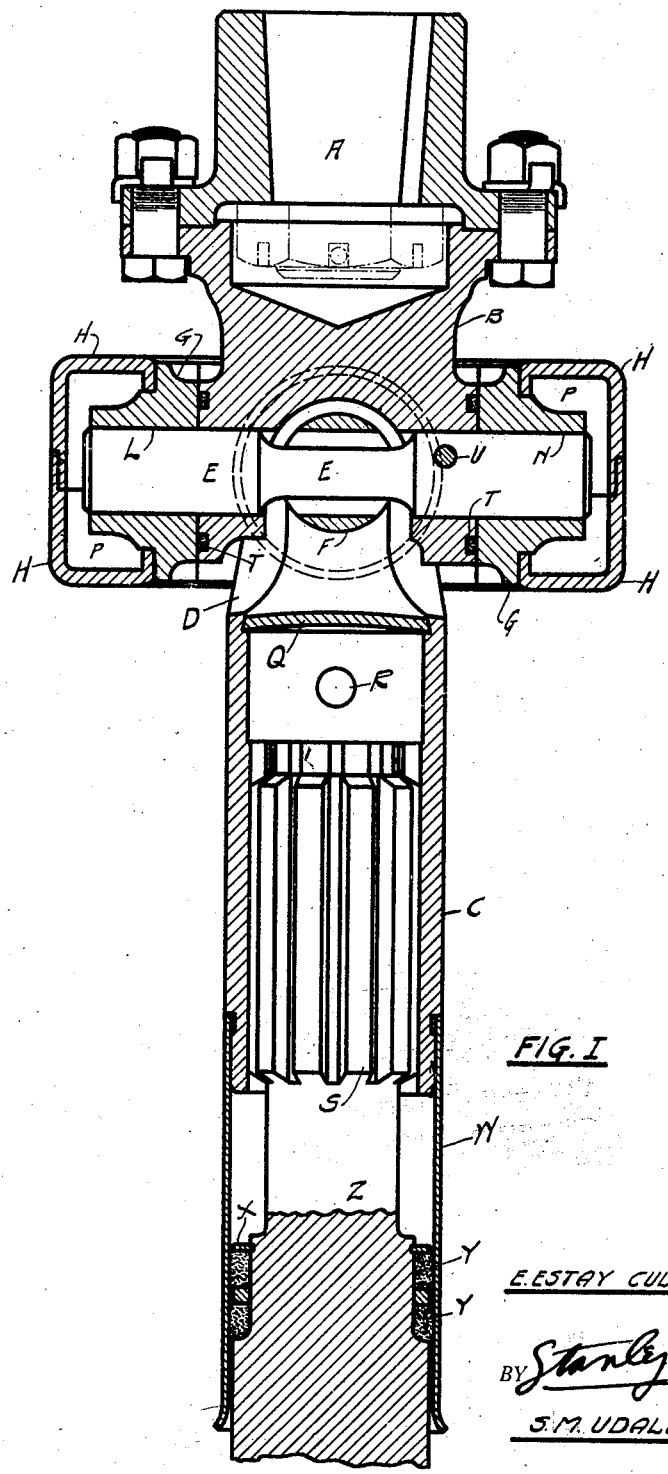

June 29, 1926. 1,590,285
E. E. CULBERTSON
UNIVERSAL JOINT
Filed Nov. 30, 1923   4 Sheets-Sheet 3
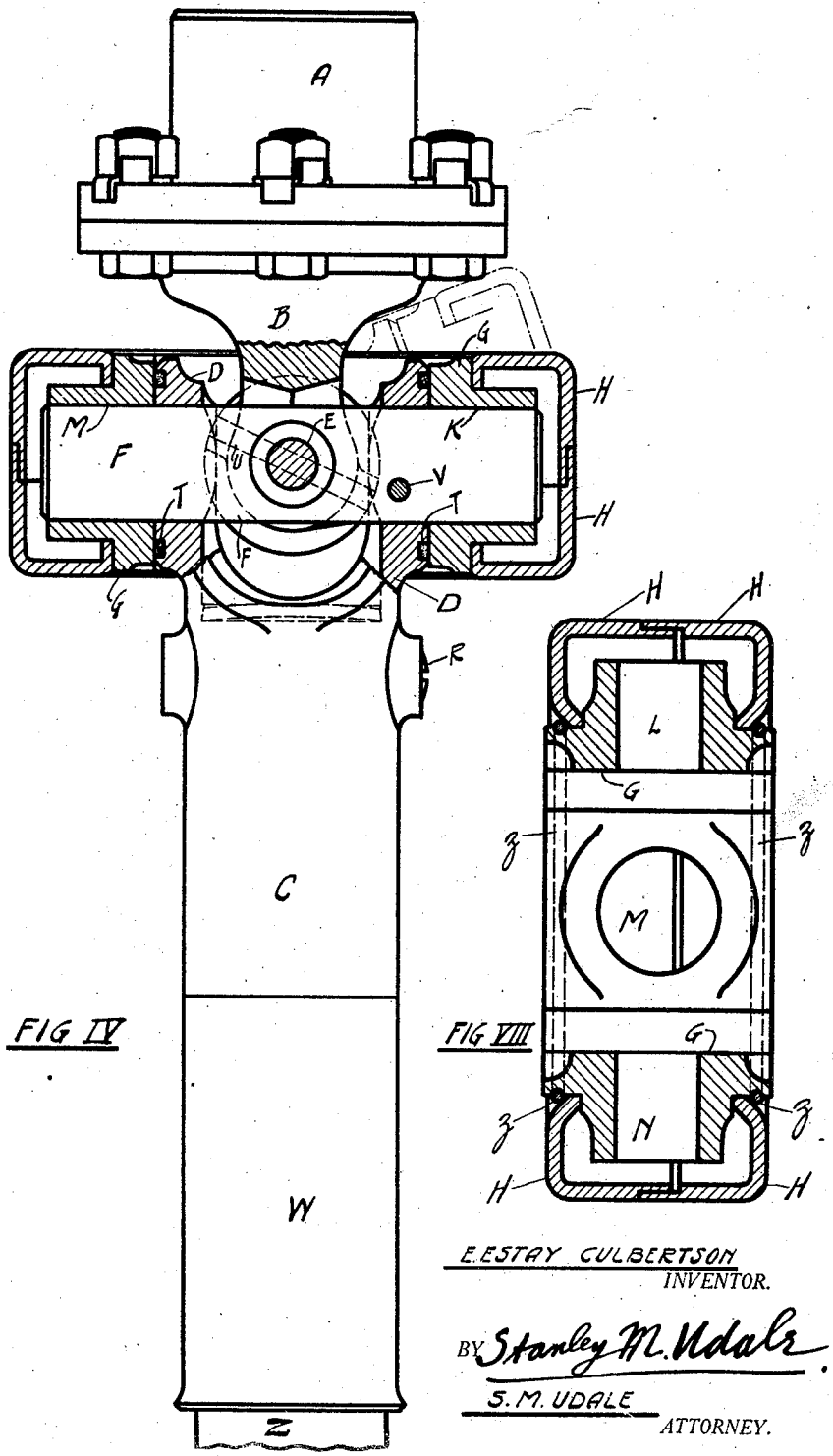

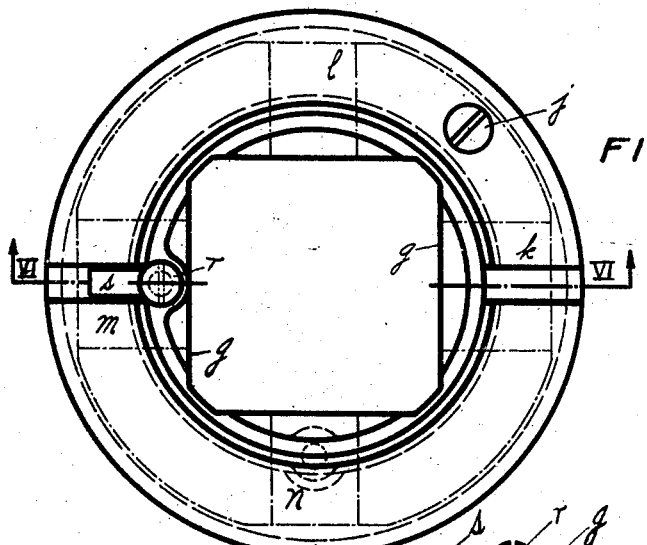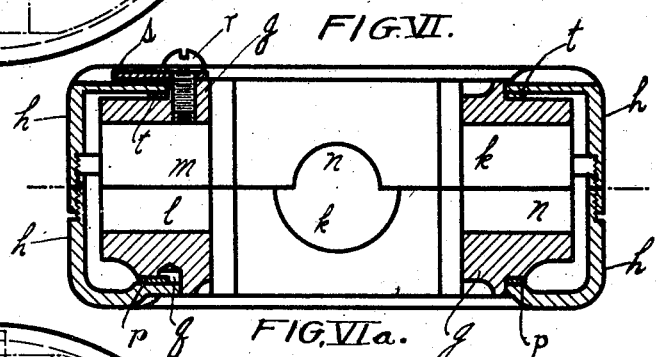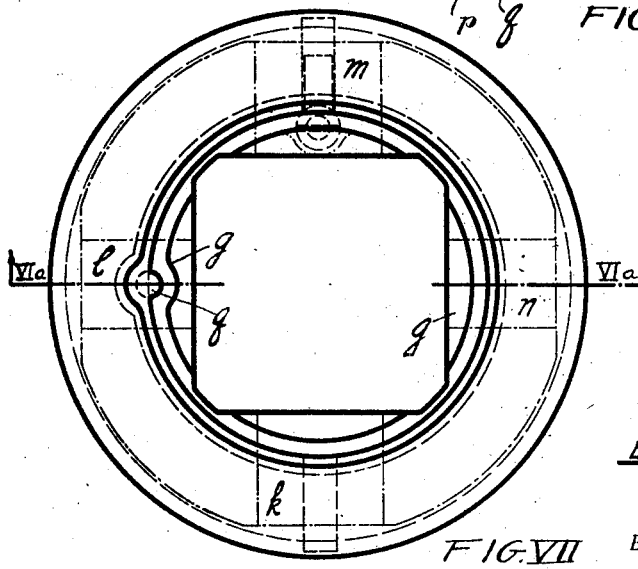

Patented June 29, 1926.

1,590,285

UNITED STATES PATENT OFFICE.

E. ESTAY CULBERTSON, OF DETROIT, MICHIGAN.

UNIVERSAL JOINT.

Application filed November 30, 1923. Serial No. 677,713.

The object of this invention is to construct a universal joint of an improved type, such as will permit the employment of a freely flowing liquid lubricant and the retension of this lubricant for an indefinite period of time against escapement due to centrifugal action. Further objects are the reduction in the number of parts and in the cost of manufacture. The specific improvement lies in the provision of a one-piece intermediate or connecting member used primarily for driving, which forms the inner periphery of the annular, lubricant carrying chamber and which permits the oscillation of the driving and driven members within its inner boundary. This single piece minimizes all tendencies toward distortion, preventing the transmission of any strains to the walls which complete the cavity, thereby preventing the possibility of destroying the oil tight joints. An additional object, is to improve the lubrication and the lubricant retaining means on the driven shaft, where it engages with the drive shaft, to which the power and motion is ultimately transmitted through the joint. Additional advantages obtained, are the elimination of openings in the outer wall, where the action of centrifugal force is greatest; the elimination of bushings with their possible loosening; greater accuracy; simplification of manufacturing operations resulting in lower manufacturing costs.

The construction permits of a greater angle of inclination between the driving and driven members than has heretofore been possible with existing devices.

Fig. I is a sectional plan view of the preferred form of the invention.

Fig. II is an elevation of Fig. I, with the driven element of the joint shown in broken lines. The view is taken looking from the driven member Z to the driving member A.

Fig. III is an elevation of the connecting ring disassembled.

Fig. IV is a partial plan on the plane IV—IV of Fig. II.

Fig. V shows, in elevation, a slightly modified connecting ring of a joint of the same type as shown in Figs. I, II, III and IV; the ring being viewed looking from the driven member Z to the driving member A.

Fig. VI shows a sectional view through the ring shown in Fig. V on the plane VI—VI of Fig. V.

Fig. VI$_{(a)}$ shows a sectional view through the ring on a plane at right angles to plane VI—VI of Fig. V; that is to say, on the plane VI$_{(a)}$—VI$_{(a)}$ of Fig. VII.

Fig. VII is an elevation of the same ring shown in Fig. V rotated through 90 degrees and viewed from the driving member A to the driven member Z.

Fig. VIII is a sectional elevation of the connecting ring, taken on the plane I—I of Fig. II; showing an alternative means for locking the ring.

In Figures I, II and III, A is the driving shaft; B is the driving fork; C is the driven sleeve; D is the driven fork; E is the driving pin or trunnions; F is the driven pin or trunnions; G is the one-piece connecting ring; H, H are the cavity sealing members, which are made a press fit on the corresponding shoulders on the ring G and the one inside the other as shown; J is an oil plug closing the opening through which the cavity in the ring G is filled with oil; K, L, M and N are hardened bearing apertures in which the pins E and F oscillate; Q is a disc washer enclosing the cavity on the end of the driven shaft C; R is the opening, (closed by a plug), through which the lubricant is inserted; S are the splines constituting the driving means of the driven shaft C; T, T are oil retaining washers provided between the fork B and the ring G, similar washers are provided between the fork D and the ring G.

In Fig. I the method of assembly is clearly shown; the complementary stampings H, H being a press fit on the ring G and in each other. The oil tight cavity in the ring G, between the bearing apertures K, L, M and N, enclosed by the complementary stamping H, H, constitute the oil reservoir for retaining the lubricant for the pins or trunnions E and F, which oscillate in the bearing apertures K, L, M and N. In order to prevent loss of oil from the cavity in the ring G, the trunnions or pins E and F are made a light drive fit in the forks B and D respectively. The ring G is adapted to be hardened, hence the bearing apertures K, L, M and N can be hardened and ground and the need for bushings is eliminated, which reduces the trouble with loose bushings.

In Fig. I a locking pin U is shown passing through the pin E and the fork B. A corresponding pin V is shown in section in Fig. IV, passing through the pin F and the fork D. In Fig. I a shaft Z is shown slidably engaging with the splines S in the driven sleeve C. A sleeve W with a flaring (bell) mouth is secured to the driven sleeve C and the shaft Z is provided with two rings of packing Y, Y separated by a ring and retained in place on the shaft Z by the split ring X.

Fig. VIII shows a method of positively retaining the complementary stamping H, H on to the connecting ring G. A pair of circlets z, z engage with grooves formed in a ledge projecting from G and provided for the purpose. The complementary rings H, H are suitably dished so that the circlet may be sprung into place after the ring has been assembled.

In Fig. VIII both the pins E and F and the forks B and D are omitted; actually, the circlets are, obviously, attached after the assembly is completed. These circlets are merely precautionary means. The complementary rings H, H are intended to be press-fits on each other and on the ring G.

As is shown by the broken lines in Fig. IV, it will be found that the construction is adapted to provide a maximum angle of inclination of 20 degrees, which gives a total variation of 40 degrees, which is more than is obtainable in present marketed constructions and this increased angle is obtained with a smaller outside diameter. The absence of bushings not only increases the life, but decreases the cost of manufacture, eliminating the necessity for securing them and, also, the possibility of their loosening. Further, the machining limits can be chosen close, as the forks fit directly into the ring, (i. e., the width of D into the opening in G); hence the difficulty experienced with the built up construction, where limits either add up or cancel out, is avoided. In other words, it is a question of one dimension as compared to another and not the summation of a number of dimensions as compared with the summation of a number of other dimensions, as is the case with the built up construction. The principal advantage, however, lies in the provision of an oil tight ring adapted to actually retain an easily flowing lubricant for an indefinitely long period of time. By not driving through the shell H, H their oil tightness is maintained.

The sliding joint Z, S, C is likewise provided with an oil, or rather a grease proof seal, whereby the lubricant is held for a long period of time between the splines.

A slight modification of the above construction is shown in the alternative construction shown in Figs. V, VI, VI(a) and VII, the complementary members h, h are threaded together and locked in place by means of a set screw r and a narrow rectangular plate s, which fits into a depression in the ring h. Gaskets t and p are provided to make oil tight the joint between h and the ring g. The gasket p is prevented from rotating by an ear, which projects into and engages with the drilled depression q, provided for this purpose. A plug j provides an opening through which lubricant may be introduced into the cavity formed by the complementary members h, h.

What I claim is:—

1. A universal joint comprising shaft members, a one piece connecting member provided with a pair of trunnion members transversely disposed and connecting the respective shaft members with said one piece connecting member, one of said trunnion members being of greater diameter and perforated to permit passage of the other of said trunnion members therethrough, an outer casing formed of complementary stampings surrounding the said connecting member and engaging therewith, providing an oil retaining chamber.

2. A universal joint having driving and driven pins, a driving and a driven fork, a connecting ring with four bearings at right angles to each other, said pins engaging with said forks and seated within said ring, a casing formed of complementary stampings surrounding the said connecting ring and engaging therewith, creating thereby an annular chamber serving as a lubricant reservoir and means for securing the trunnions to their respective forks.

3. A universal joint having driving and driven pins arranged at right angles to each other, a driving and a driven fork, a connecting ring provided with hardened and ground bearings at substantially right angles to each other, said pins engaging with said forks and seated within said ring, an outer casing formed of complementary stampings surrounding said connecting member and engaging therewith, thereby creating with said connecting ring an annular chamber within which lubricant is retained for lubricating the trunnions.

4. In a universal joint of the radially disposed trunnion type adapted to flexibly couple two adjacent shaft sections, a driving fork for one of said shafts equipped with a set of aligned trunnions, a driven fork for the other of said shafts equipped with a set of trunnions respectively disposed in intermediary relation with regard to the first named trunnions, a ring shaped member terminating in annular end faces encircling the shaft axis and provided with four bearing apertures adapted to seat said radial trunnions, a casing surrounding the said ring member and engaging therewith, thereby creating an annular lubricant chamber serving to supply lubricant to each of said trunnions, said casing being formed of interfitting peripheral flange elements forming leak proof joints with the faces of said ring member and having an interlocking joint at the periphery.

5. In a universal joint of the radially disposed trunnion type adapted to flexibly couple two adjacent shaft sections and transmit torque therebetween, a driving fork for one of said shafts equipped with a set of aligned trunnions, a driven fork for the other of said shafts equipped with a set of trunnions respectively disposed in intermediary relation with regard to the first named trunnions, a ring shaped member terminating in annular end faces encircling the shaft axis and provided with four bearing apertures adapted to seat said radial trunnions and act as the means for transmitting the torque between the respective sets of trunnions, a casing surrounding the said ring member and engaging therewith, thereby creating an annular lubricant chamber serving to supply lubricant to each of said trunnions, said casing being formed of two interfitting peripheral flanged elements which form leak proof joints with the edges of the said ring member and have a leak proof interfitting ring joint at the periphery.

6. In a universal joint of the radially disposed trunnion type adapted to flexibly couple two adjacent shaft sections and transmit torque therebetween, a driving fork for one of said shafts equipped with a set of aligned trunnions, a driven fork for the other of said shafts equipped with a set of trunnions respectively disposed in intermediary relation with regard to the first named trunnions, a ring shaped member terminating in annular end faces encircling the shaft axis and provided with bearing apertures adapted to seat said trunnions and act as the sole means for transmitting torque between the respective sets of trunnions, an outer casing surrounding the said ring member and engaging therewith, thereby creating an annular lubricant chamber serving to supply lubricant to each of said trunnions, said casing being formed of interfitting peripheral flange elements which form leak proof joints with the edges of the said ring member and have a leak proof interfitting ring joint at the periphery, the said casing being separately attached, freely clearing the hubs of said forks, and serving primarily as a lubricant reservoir, being dispensable as a medium for torque transmission.

In testimony whereof I affix my signature.

E. ESTAY CULBERTSON.